United States Patent
Tichvon et al.

(10) Patent No.: US 6,193,267 B1
(45) Date of Patent: Feb. 27, 2001

(54) STEERING WHEEL ASSEMBLY

(75) Inventors: Michael T. Tichvon, Rochester Hills; Peter C. Feldman, Almont; Patricia O. Stein, Leonard; Anthony C. Burgi, Rochester, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/089,196

(22) Filed: Jun. 2, 1998

(51) Int. Cl.$^7$ .................................................. B60R 21/16
(52) U.S. Cl. ........................................ 280/728.2; 280/731
(58) Field of Search .................................. 280/728.2, 731; 74/552

(56) References Cited

U.S. PATENT DOCUMENTS

| | | | |
|---|---|---|---|
| 5,470,099 | * | 11/1995 | Williams . |
| 5,584,501 | * | 12/1996 | Walters . |
| 5,584,503 | * | 12/1996 | Lutz . |
| 5,615,910 | * | 4/1997 | Margetak et al. . |
| 5,636,859 | * | 6/1997 | Williams et al. . |
| 5,676,396 | * | 10/1997 | Fohl . |
| 5,692,769 | * | 12/1997 | Scharboneau et al. . |
| 5,692,770 | * | 12/1997 | Scharboneau et al. . |
| 5,749,598 | * | 5/1998 | Exner et al. ............... 280/728.2 |
| 5,765,865 | * | 6/1998 | Nagata et al. ................ 280/731 |
| 5,878,629 | * | 3/1999 | Nagata et al. ................... 74/552 |
| 5,887,494 | * | 3/1999 | Papandreou ................. 81/57.29 |
| 5,897,133 | * | 4/1999 | Papandreou ............... 280/728.2 |

FOREIGN PATENT DOCUMENTS

2133955 * 11/1990 (JP) .

OTHER PUBLICATIONS

U.S. Patent 5,897,133 filed Aug. 11, 1997 entitled "Steering Wheel with Integral Air Bag Cover".*

U.S. Patent 5,887,494 filed Aug. 11, 1997 entitled "Steering Wheel Assembly".*

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A steering wheel assembly (10) mounts on a vehicle steering shaft (14) which has a threaded end portion (18). The steering wheel assembly (10) comprises a steering wheel armature (20), an inflatable vehicle occupant protection device (80) supported on the steering wheel armature (20), an inflator (90) for providing inflation fluid for inflating the inflatable vehicle occupant protection device (80), a hub (160) fixedly attached to the steering wheel armature (20) and for non-rotatable attachment to the steering shaft (14), and a rotatable fastener (180) rotatably supported on the hub (160) for axially forcing the hub onto the steering shaft (14) upon rotation of the fastener in a first direction. The fastener (180) has a first end portion (182) including gearing (190) for rotating the fastener and a second end portion (184) for threadedly engaging the threaded end portion (18) of the steering shaft (14) upon rotation of the fastener. A retainer plate (200) spaced from the inflator (90) is fixedly attached with the steering wheel armature (20). The retainer plate (200) overlies the first end portion (182) of the fastener (180) and retains the fastener on the steering wheel armature (20).

19 Claims, 6 Drawing Sheets

STEERING WHEEL ASSEMBLY

TECHNICAL FIELD

The present invention is related to a steering wheel assembly which is mounted on a steering shaft of a vehicle and which is rotatable to steer the vehicle.

BACKGROUND OF THE INVENTION

A vehicle steering wheel is typically attached to a vehicle steering shaft by a splined connection. The splined connection non-rotatably attaches the steering wheel to the steering shaft and transmits torque from the steering wheel, namely, torque generated during turning of the steering wheel, to the steering shaft. The steering wheel is additionally secured to the steering wheel by a nut to prevent relative axial movement between the steering wheel and the steering shaft. The nut is screwed onto a threaded extension located on the end of the steering shaft which extends into the passenger compartment of the vehicle. Usually, the nut is accessed by an installer through the center of the steering wheel once the steering wheel has been placed onto the steering shaft. An air bag module is then typically mounted in the center of the steering wheel and covers the nut.

Another type of connection for connecting a vehicle steering wheel to the steering shaft utilizes tapered surfaces on the steering shaft and inside a hub portion of the steering wheel. A gear-headed bolt is used to bring the tapered surfaces into non-rotatable engagement. Threads on the bolt engage an internally threaded surface on the steering shaft to pull the steering wheel onto the steering shaft. The gear head of the bolt is driven by a tool which is inserted into the steering wheel from the side (i.e., perpendicular to the axis of rotation).

SUMMARY OF THE INVENTION

The present invention is a steering wheel assembly to be mounted on a vehicle steering shaft which rotates about an axis to steer a vehicle and which has a threaded end portion. The steering wheel assembly comprises a steering wheel armature, an inflatable vehicle occupant protection device supported on the steering wheel armature, an inflator for providing inflation fluid for inflating the inflatable vehicle occupant protection device, a hub fixedly attached to the steering wheel armature and for non-rotatable attachment to the steering shaft, and a rotatable fastener rotatably supported on the hub for axially forcing the hub onto the steering shaft upon rotation of the fastener in a first direction. The fastener has a first end portion including gear means for rotating the fastener and a second end portion for threadedly engaging the threaded end portion of the steering shaft upon rotation of the fastener. A retainer plate spaced from the inflator is fixedly attached with the steering wheel armature. The retainer plate overlies the first end portion of the fastener and retains the fastener on the steering wheel armature.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
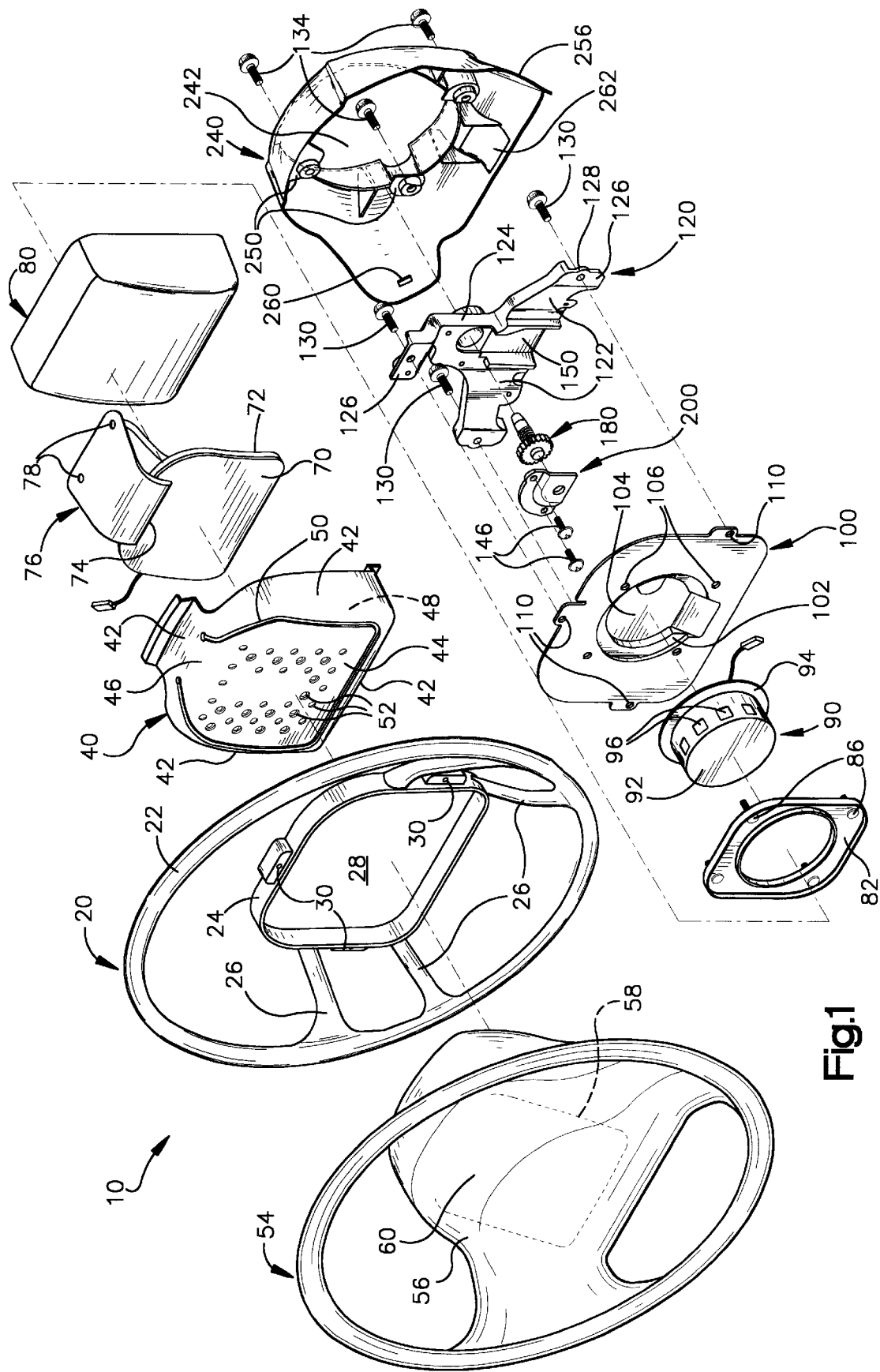
FIG. 1 is an exploded perspective view of a steering wheel assembly constructed in accordance with the present invention.
Figure 2:
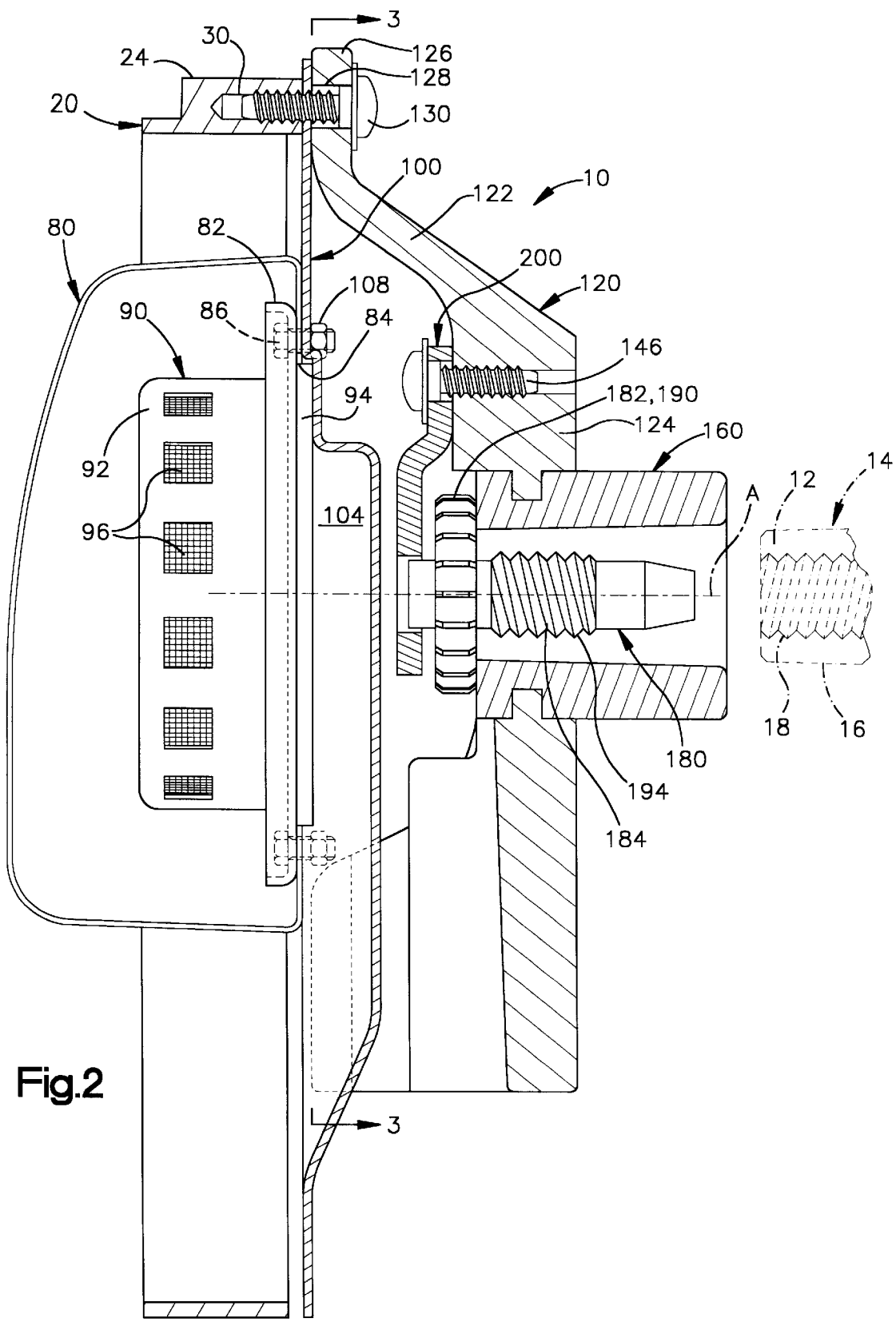
FIG. 2 is a sectional view of the steering wheel assembly of FIG. 1 with parts omitted for clarity.

An exploded perspective view of a steering wheel assembly 10 constructed in accordance with the present invention is shown in FIG. 1. The steering wheel assembly 10 is to be mounted on an end portion 12 of a vehicle steering shaft 14 (shown in phantom lines in FIG. 2). The end portion 12 of the steering shaft 14 is hollow and has a tapered outer surface 16 which includes diametrically opposed flats (not shown). The end portion 12 has an inner surface 18 which is threaded.

The steering wheel assembly 10 includes a steering wheel armature 20 (FIG. 1). The steering wheel armature 20 is preferably constructed in accordance with the invention described in Applicant's co-pending application U.S. Ser. No. 09/004,244, entitled "Steering Wheel Armature", filed Jan. 8, 1998, Attorney Docket No. TRW(AP)3788. The armature 20 is preferably made of cast magnesium. The armature 20 has a circular outer rim portion 22 and an inner ring portion 24 connected by a plurality of radially and axially extending spokes 26. The ring portion 24 defines a central opening 28 in the armature 20. The ring portion 28 includes three axially extending apertures 30 spaced about the ring portion.

The steering wheel assembly 10 further includes a plastic insert 40 located in the central opening 28 in the armature 20. The insert 40 is preferably made of a thermoplastic material. The insert 40 has four side walls 42 and front wall 44 which is connected to one of the side walls in a hinge area 46. The side walls 42 and the front wall 44 together define a cavity 48 in the insert 40. A generally U-shaped gap 50 separates the front wall 44 from three of the four side walls 42. The front wall 44 includes a plurality of openings 52.

An integral one-piece cover 54 is molded about the steering wheel armature 20 and the insert 40. The cover 54 covers the outer rim portion 22, the inner ring portion 24 and the spokes 26 of the steering wheel armature 20. Further, the cover 54 has a continuous outer surface 56 which extends uninterruptedly over the insert 40. The cover 54 is preferably made of a homogenous urethane material. As the cover 54 is molded about the insert 40, portions of the material of the cover 54 fill the gap 50 defined in the insert to form a generally U-shaped tear seam 58 which is preferably not visible in the outer surface 56. Additional portions of the cover material fill the openings 52 in the front wall 44 of the insert 40 to form a composite deployment door 60. The tear seam 58 outlines the boundaries of the deployment door 60.

It is contemplated that the cover 54 could alternatively be made of several cover portions rather than the one-piece cover shown. For example, an alternate cover construction could comprise a first cover portion covering the outer rim portion 22 and the spokes 26 of the armature 20, while a second cover portion covers the inner ring portion 24 of the armature and the insert 40.

The steering wheel assembly 10 includes a horn switch 70 and an associated backing plate 72 for the horn switch. The horn switch 70 is preferably a membrane type switch known in the art. The backing plate 72 is a semi-rigid part preferably made of a plastic material. The horn switch 70 and backing plate 72 are generally rectangular in shape and are located in the cavity 48 in the insert 40. The horn switch 70 is located between the deployment door 60 and the backing plate 72. The horn switch 70 is actuatable by exerting manual pressure on the outer surface 56 of the cover 54 covering the deployment door 60. Both the horn switch 70 and the backing plate 72 have an elongated slot 74. A fabric tether 76 having an hourglass shape and a pair of openings 78 at each end extends through the slots 74 in the horn switch 70 and the backing plate 72, respectively, and is folded over so that the openings 78 at both ends of the tether 76 are aligned.

An inflatable vehicle occupant protection device, such as an air bag 80, is located in the cavity 48 in the insert 40 of the steering wheel assembly 10. The air bag 80, shown schematically in the drawings, is folded inside the cavity 48 and abuts the backing plate 72 as well as the four side walls 42 of the insert 40. The air bag 80 is of known construction and includes a generally ring-shaped air bag retainer 82 (FIGS. 1 and 2) having four equally spaced mounting apertures (not numbered). The air bag retainer 82 is located inside the air bag 80 and encircles a mouth 84 of the air bag. A stud 86 extends through each of the four apertures in the air bag retainer 82 and through corresponding apertures (not numbered) in the air bag 80. Two of the studs 86 also extend through the openings 78 in the tether 76.

The steering wheel assembly 10 further includes an air bag inflator 90 and a reaction plate 100. The air bag inflator 90 is electrically actuatable to provide inflation fluid to inflate the air bag 80. The inflator 90 includes a cylindrical body portion 92 and a flange portion 94 extending radially from the body portion. The body portion 92 of the inflator 90 includes a plurality of circumferentially spaced fluid exit ports 96 and is located inside the air bag 80. The flange portion 94 of the inflator 90 is circular and extends beyond the mouth 84 of the air bag 80.

The reaction plate 100 is a generally rectangular part preferably made of hardened steel. The reaction plate 100 includes a generally circular first depression 102 (FIG. 1) for receiving the flange portion 94 of the inflator 90. A generally circular second depression 104 (FIGS. 1 and 2) in the reaction plate 100 is formed radially inward of the first depression 102 and accommodates wiring from the inflator 90. Four openings 106 (FIG. 1) are spaced around the first depression 102 in the reaction plate 100 and are located so as to align with the studs 86 projecting from the air bag retainer 82. Nuts 108 are screwed on the studs 86 to secure the air bag 80 and the inflator 90 to the reaction plate 100. The reaction plate 100 further includes three openings 110 spaced and located identically to the three openings 30 in the ring portion 24 of the steering wheel armature 20.

Figure 3:
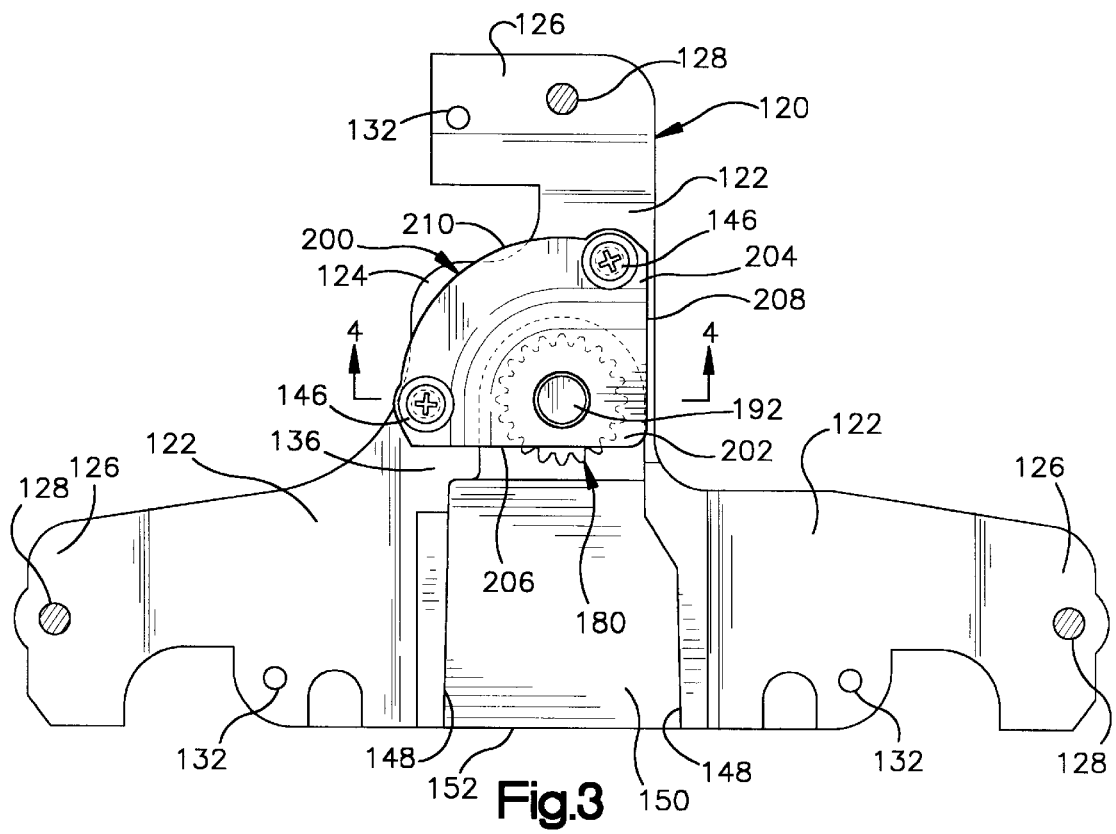
FIG. 3 is a view taken along line 3—3 in FIG. 2 with parts omitted for clarity.

The steering wheel assembly 10 further comprises a mounting bracket 120 commonly referred to as a spider or spider member. The mounting bracket 120 is preferably made of cast magnesium. The mounting bracket 120 has three leg portions 122 which extend radially and axially from a base portion 124 (FIG. 3). Each leg portion 122 includes a foot portion 126 located at a terminal end of the leg portion 122. The foot portions 126 are axially offset from the base portion 124. Each foot portion 126 has an opening 128 which aligns with a respective one of the three openings 110 in the reaction plate 100 and a respective one of the three openings 30 in the ring portion 24. Fasteners, such as self-tapping screws 130 (FIGS. 1 and 2), extend through the openings 128 in the foot portions 126, through the openings 110 in the reaction plate 100, and into the openings 30 in the ring portion 24 to secure the mounting bracket 120 in the steering wheel assembly 10. The connection of the mounting bracket 120 to the ring portion 30 also secures the reaction plate 100, to which the air bag 80 and the inflator 90 are attached, in the steering wheel assembly 10. The mounting bracket 120 further includes three openings 132 (FIG. 3) for receiving fasteners 134 which secure a back cover 240 to be described later.

The base portion 124 of the mounting bracket 120 has a base surface 136 facing the reaction plate 100 and an axially extending surface 138 (FIG. 4) which extends perpendicularly from the base surface. The axially extending surface 138 defines a central passage 140 through the base portion 124 of the mounting bracket 120. The passage 140 is centered on an axis A. An annular ridge 142 extends from the axially extending surface 138 radially inwardly into the passage 140. Two spaced apart holes 144 are located in the base portion 124 of the mounting bracket 120 surrounding the passage 140. Each of the holes 144 is threaded to receive a screw 146.

The base portion 124 of the mounting bracket 120 further includes two radially and axially extending ridges 148. The ridges 148 define a generally rectangular channel 150 in the base portion 124 extending radially inward from a perimeter edge 152 of the mounting bracket 120 to the passage 140.

A metal hub 160 is partially located in the passage 140 in the base portion 124 of the mounting bracket 120. The hub 160 is generally tubular in shape and is centered on the axis A. The hub 160 is preferably cast into the mounting bracket 120 and is thus fixed to the bracket. The annular ridge 142 of the mounting bracket 120 extends into the material of the hub 160 to attach the hub to the mounting bracket non-rotatably during casting. Alternatively, it should be understood that the hub 160 could be formed integrally with the mounting bracket 120 as a one-piece cast part.

The hub 160 includes radially extending first and second end surfaces 162 and 164. The first end surface 162 faces toward the reaction plate 100 and is recessed from the base surface 136 of the mounting bracket 120 by a distance S1. An axially extending surface 166 defines a bore 168 extending from the first end surface 162 to the second end surface 164 of the hub 160. The bore 168 is centered on the axis A. The surface 166 defining the bore 168 is tapered to have an interference fit with the tapered outer surface 16 of the steering shaft 14. The surface 166 inside the hub 160 further includes diametrically opposed flats (not shown) for mating with the corresponding flats on the outer surface 16 of the steering shaft 14.

The steering wheel assembly 10 includes a rotatable fastener 180 centered on the axis A. The fastener 180 has a first end portion 182 and a second end portion 184 which extends from the first end portion. The first and second end portions of the fastener 180 are fixed together and rotate together. Preferably, the fastener 180 is made from one piece of a metallic material.

Figure 4:
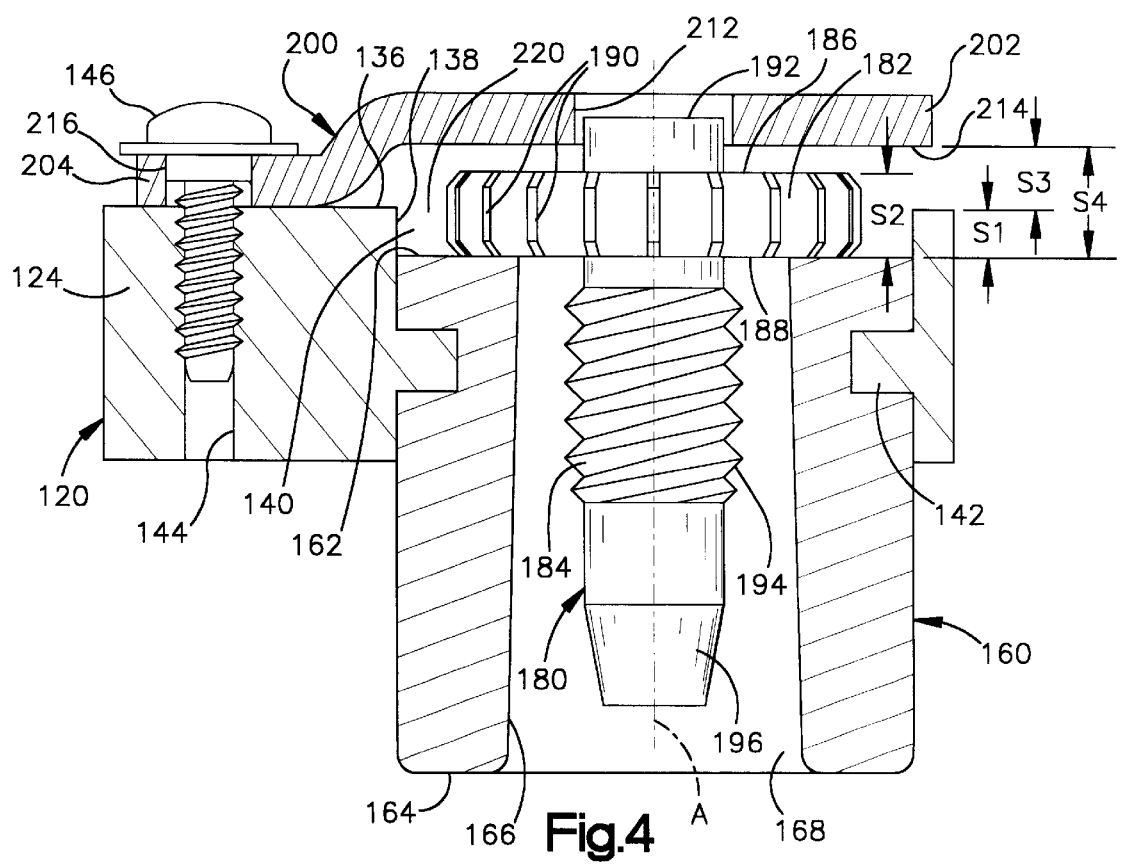
FIG. 4 is a sectional view taken along line 4—4 in FIG. 3.
Figure 5:
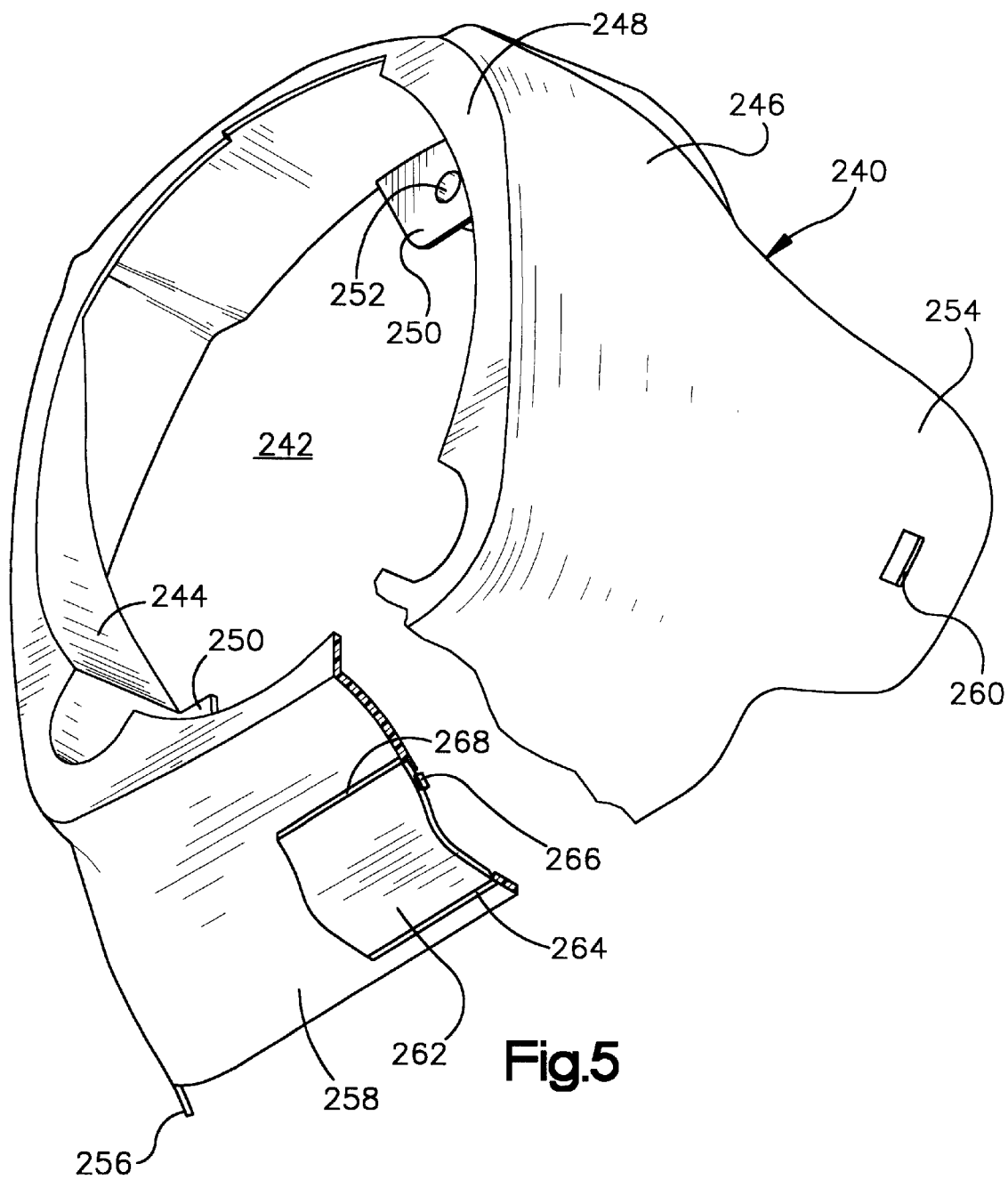
FIG. 5 is a perspective view of a component of the steering wheel assembly shown in FIG. 1.

The first end portion 182 of the fastener 180 is disk-shaped and includes parallel, radially extending first and second surfaces 186 and 188, respectively (FIGS. 4 and 5). The first and second surfaces 186 and 188 are separated by a distance S2 which is the axial thickness of the first end portion 182 of the fastener 180. The first end portion 182 of the fastener 180 is configured as a spur gear and thus has axially extending gear teeth 190 which are circumferentially disposed about the perimeter of the first end portion 182.

The second end portion 184 of the fastener 190 extends axially from the second surface 188 of the first end portion 182 of the fastener. A cylindrical projection 192 extends axially from the first surface 186 of the first end portion 182 in a direction opposite the direction in which the second end portion 184 extends. The cylindrical projection 192 is centered on the axis A.

The second end portion 184 of the fastener 180 includes an externally threaded portion 194 and an anti-cross-threading tip 196 adjacent the terminal end of the fastener. The threaded portion 194 of the second end portion 184 of the fastener 180 is threaded to mate with the threaded inner surface 18 in the end portion 12 of the steering shaft 14.

The first end portion 182 of the fastener 190 rests on and is supported for rotation by the first end surface 162 of the hub 160. The second end portion 184 of the fastener 190 is located within and rotatable in the bore 168 through the hub 160. The fastener 190 is rotatable about the axis A which is coaxial with the axis of rotation of the vehicle steering shaft 14.

The steering wheel assembly 10 further includes a retainer plate 200 (FIGS. 3 and 4). The retainer plate 200 is preferably made of hardened steel. The retainer plate 200 has a generally square central portion 202 partially encircled by a peripheral portion 204 of the retainer plate. Both the central portion 202 and the peripheral portion 204 of the retainer plate 200 are planar. The peripheral portion 204 of the retainer plate 200 abuts the base surface 136 of the mounting bracket 120. The central portion 202 of the retainer plate 200 is axially offset from the peripheral portion 204 by a distance S3.

The perimeter of the retainer plate 200 is defined by three side surfaces. First and second side surfaces 206 and 208 are planar and are perpendicular to one another. A third side surface 210 connects the first and second side surfaces 206 and 208 and is arcuate. Both the first and second side surfaces 206 and 208 extend along the peripheral portion 202 and the central portion 204 of the retainer plate 200. The third side surface 210 extends only along the peripheral portion 204 of the retainer plate 200.

The central portion 202 of the reaction plate 200 includes a circular opening 212. The cylindrical projection 192 on the fastener 180 is received in the opening 212 with sufficient clearance around the projection to allow for unrestricted rotation of the fastener in the opening. The central portion 202 of the retainer plate 200 further includes a reaction surface 214 surrounding the opening 212 and facing the fastener 180.

The peripheral portion 204 of the retainer plate 200 includes two spaced apart clearance holes 216. The clearance holes 216 in the retainer plate 200 align with the holes 144 in the base portion 124 of the mounting bracket 120. The screws 146 extend through the holes 216 in the retainer plate 200 and into the threaded holes 144 in the base portion 124 of the mounting bracket 120 to attach the retainer plate to the mounting bracket.

With the retainer plate 200 attached to the mounting bracket 120, an axial space 220 is formed between first end surface 162 of the hub 160 and the central portion 202 of the retainer plate 200. The axial space 220 has a height S4 which is equal to the sum of the distance S1 (between the first end surface 162 of the hub 160 and the base surface 136 of the mounting bracket 120) and the distance S3 (the axial offset of the retainer plate 200). The height S4 of the axial space 220 is greater than the axial thickness S2 of the first end portion 182 of the fastener 180. The height S4 of the axial space 220 permits limited axial movement of the first end portion 182 of the fastener 180 in the axial space while retaining the first end portion 182 of the fastener 180 in the space and thereby retaining the second end portion 184 of the fastener in the bore 168 in the hub 160.

The back cover 240 (FIG. 5) for the steering wheel assembly 10 encloses the back side of the steering wheel assembly facing the vehicle steering shaft 14. The back cover 240 is preferably made of ABS molded plastic but could be made of another plastic material. The back cover 240 has a large opening 242 for encircling a vehicle steering column (not shown). The opening 242 is defined by an axially extending cylindrical inner wall 244 and an outer wall 246 which is connected to the inner wall by a back face 248. The back cover 240 includes three radially extending flanges spaced about the opening 242 which serve as mount locations 250 for the back cover 240. Each mount location 250 has a hole 252 for receiving a respective one of the fasteners 134. The back cover 240 is attached to the mounting bracket 120 by the three fasteners 134 which extend through the holes 252 in the mount locations 250.

The outer wall 246 includes first and second wing portions 254 and 256 (FIGS. 1 and 5) located opposite one another. A lower wall 258 extends between the first and second wing portions 254 and 256 and also connects with the back face 248 of the back cover 240. Each of the wing portions 254 and 256 has an ear tab 260 for engaging a surface (not shown) in the back side (i.e., facing away from the vehicle occupant) of the molded cover 54 between adjacent spokes 26 of the steering wheel assembly 10.

The lower wall 258 of the back cover 240 includes a hinged trap door 262. The trap door 262 is generally square in shape and is attached to the lower wall 258 by a living hinge 264 formed in the material of the lower wall. One or more tabs 266 on the trap door 262 hold the trap door flush with the lower wall 258. A groove 268 is formed in the lower wall 258 immediately above the trap door 262. The groove 268 allows a tool such as a screwdriver to be inserted underneath the trap door 262 in order to pry the trap door open. The living hinge 264 permits the trap door 262 to fold out away from the steering wheel assembly 10 so that an attachment tool (not shown) can be inserted inside the steering wheel assembly 10 to rotate the fastener 180.

To attach the steering wheel assembly 10 to the steering shaft 14, the hub 160 in the mounting brackeft 120 is located coaxial with the steering shaft. The hub 160 is placed oaver the end 12 of the steering shaft 14 such that the end of the steering shaft is received in the bore 168 in the hub. The corresponding flats on the outer surface 16 of the steering shaft 14 and in the bore 168 are aligned. By manually pushing the steering wheel assembly 10 toward the steering shaft 14, the tapered outer surface 16 of the steering shaft is brought into contact with the tapered surface 166 inside the bore 168 in the hub 160. The anti-cross-threading portion 196 of the second end portion 184 of the fastener 180 extends down inside the steering shaft 14 and the threaded portion 194 of the fastener engages the threaded inner surface 18 of the steering shaft. The trap door 262 in the back cover 240 of the steering wheel assembly 10 is then opened.

An attachment tool (not shown) for rotating the fastener 180 is inserted through the trap door 262. The attachment tool slides into the channel 150 formed in the base portion 124 of the mounting bracket 120 until gear teeth on the attachment tool meshingly engage the gear teeth 190 on the first end portion 182 of the fastener 180. The gear teeth on the attachment tool are rotated in a direction causing the fastener 180 to rotate in a tightening direction and to begin screwing itself into the end 12 of the steering shaft 14. The retainer plate 200 overlying the first end portion 182 of the fastener 180 stabilizes the fastener during rotation and prevents the fastener from being tilted due to axial forces exerted on the fastener by the attachment tool or due to torque resulting from the rotation of the gears.

The rotation of the fastener 180 in the tightening direction moves the second surface 188 in the first end portion 182 of the fastener into contact with the first end surface 162 of the hub 160 and exerts an axial force on the hub which causes the steering wheel assembly 10 to be pulled downward (to the right as viewed in FIG. 2) onto the steering shaft 14. As the steering wheel assembly 10 is forced onto steering shaft 14, the tapered surfaces 166 and 16 in the hub 160 and on the steering shaft 14, respectively, are pressed together to secure the steering wheel assembly to the steering shaft.

The diametrically opposed flats on the surface 16 of the steering shaft 14 and in the bore 168 in the hub 160 provide an alignment of the steering wheel assembly 10 and the steering shaft as well as a means for transmitting torque from the steering wheel assembly to the steering shaft. Torque which is produced by turning the steering wheel assembly 10 (i.e., steering the vehicle) is transmitted through the steering wheel armature 20 and the mounting bracket 120 to the hub 160 which is now non-rotatably attached to the steering shaft 14.

The steering wheel assembly 10 is removed from the steering shaft 14 by opening the trap door 262 and inserting the attachment tool so that its gear teeth are engaged with the gear teeth 190 on the fastener 180. The fastener 180 is then rotated in an untightening direction opposite the tightening direction. Rotation in the untightening direction causes the fastener 180 to move axially and relatively away from the steering shaft 14. The second surface 188 in the first end portion 182 of the fastener 180 comes out of contact with the first end surface 162 of the hub 160. Continued rotation of the fastener 180 in the untightening direction brings the first surface 186 in the first end portion 182 of the fastener 180 into contact with the reaction surface 214 in the central portion 202 of the retainer plate 200. With the surface 186 of the fastener 180 abutting the reaction surface 214 of the retainer plate 200, rotation of the fastener applies an axial force on the steering wheel assembly 10 in a direction away from the steering shaft 14 and causes the hub 160 to disengage from the steering shaft.

Figure 6:
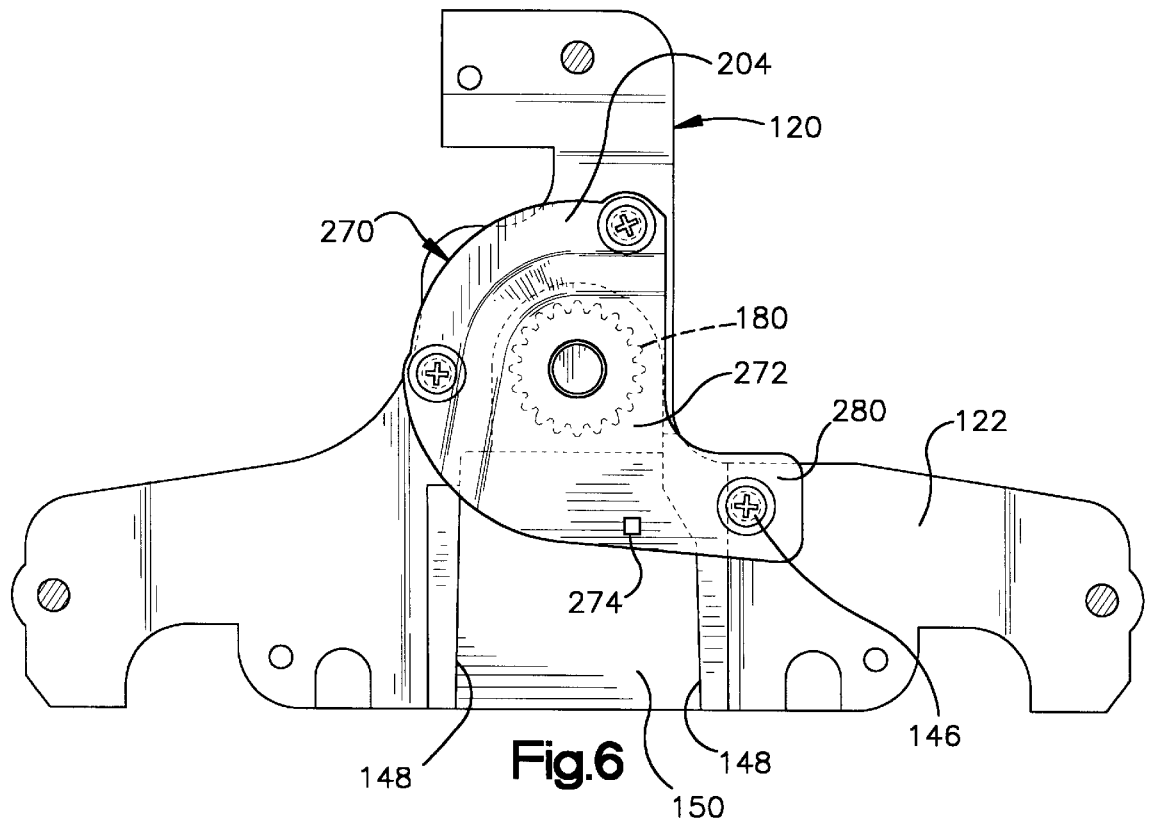
FIG. 6 is a view similar to FIG. 3 illustrating a second embodiment of the present invention.

FIG. 6 illustrates a second embodiment of the present invention. In the embodiment of FIG. 6, identical structure to that of the previous embodiment is identified with the same reference numerals. FIG. 6 illustrates a retainer plate 270 having a slightly modified structure from the retainer plate 200 of the previous embodiment.

The retainer plate 270 has a larger central portion 272 than the retainer plate 200. The central portion 272 extends completely over the first end portion of the fastener 180 and covers a portion of the channel 150 formed in the mounting bracket 120 by ridges 148. A small square-shaped opening 274 is located in the portion of the central portion 272 covering the channel 150. Further, the central portion 272 of the retainer plate 270 includes an extension 280 which extends in the direction of one of the leg portions 122 of the mounting bracket 120 and which provides the central portion with an L-shaped configuration. The extension 280 of the central portion 272 has an additional opening (not shown) for receiving a third fastener 146 for securing the retainer plate 270 to the mounting bracket 120.

The retainer plate 270 functions identically to the retainer plate 200 described in the previous embodiment, but has additional advantages. By virtue of its larger size and its three mounting locations, the retainer plate 270 is able to withstand larger forces than the retainer plate 200 on its reaction surface 214 (not shown) during untightening of the fastener 180. Because a portion of the channel 150 which guides the attachment tool to the fastener 180 is covered by the retainer plate 270, the retainer plate stabilizes the end of the attachment tool during tightening and/or untightening of the fastener 180. Finally, the square-shaped opening 274 in the central portion 272 of the retainer plate 270 overlying the channel 150 accommodates a retention feature on the attachment tool to further stabilize the tool during tightening and/or untightening of the fastener 180.

Figure 7:
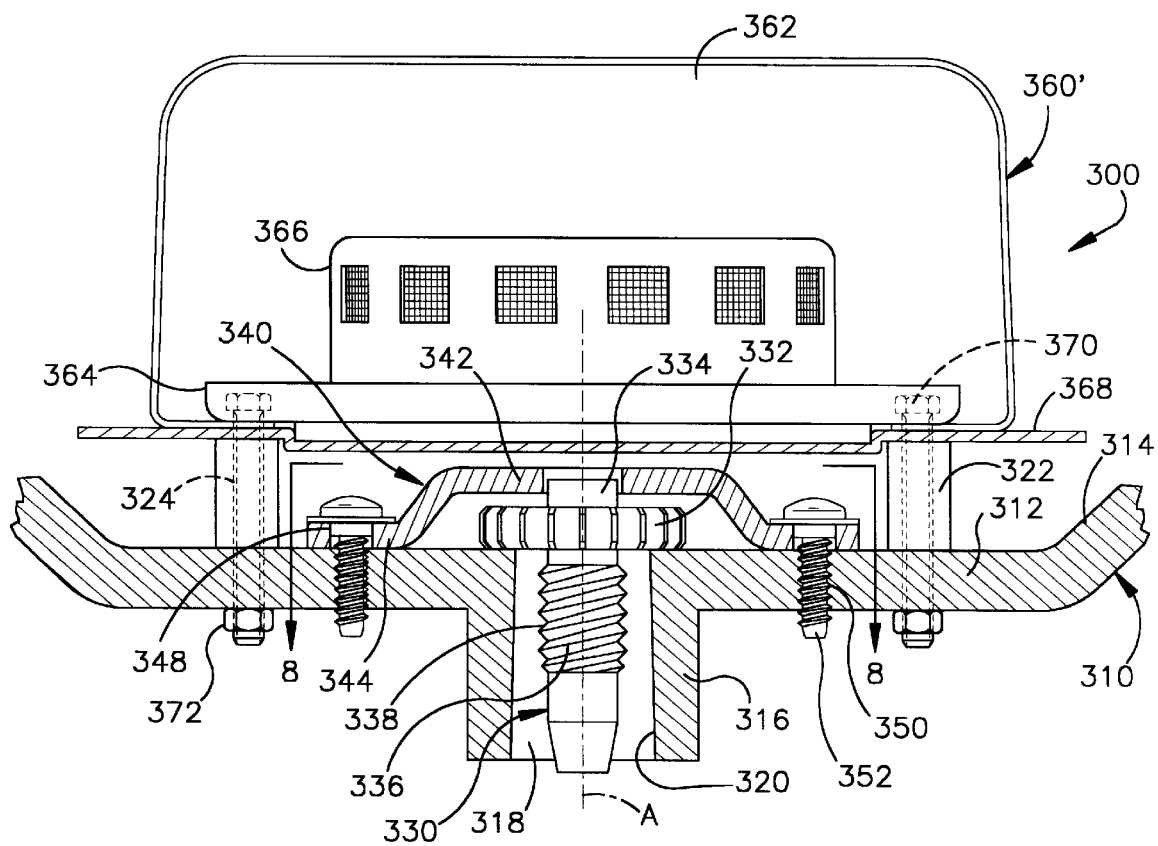
FIG. 7 is a schematic sectional view of a steering wheel assembly constructed in accordance with a third embodiment of the present invention.
Figure 8:
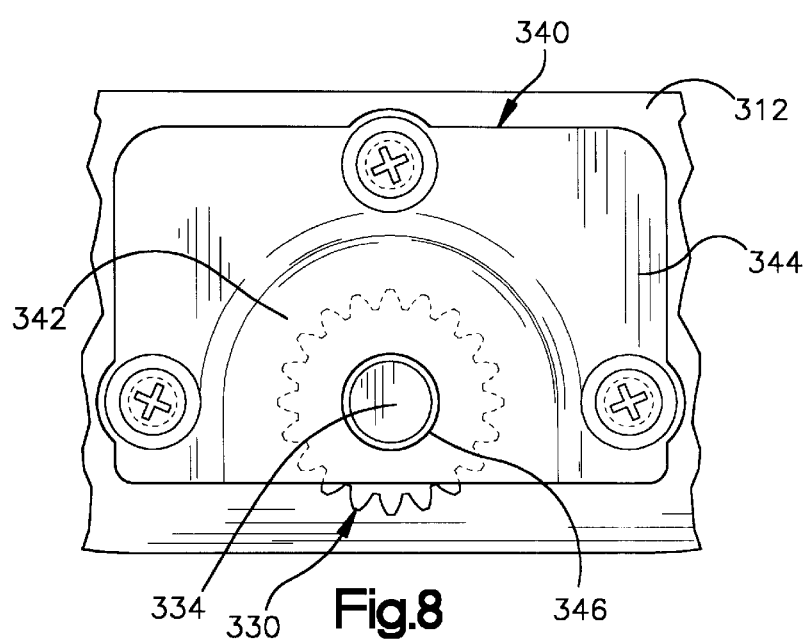
FIG. 8 is a view taken along line 8—8 in FIG. 7.

FIGS. 7 and 8 illustrate a steering wheel assembly 300 constructed in accordance with a third embodiment of the present invention. The steering wheel assembly 300 includes a steering wheel armature 310 having a rim portion (not shown) and a central mounting plate 312 connected to the rim portion by spokes 314. The mounting plate 312 includes a hub portion 316 with a bore 318 defined by a tapered surface 320. The hub portion 316 may be formed in one piece with the mounting plate 312 or may be a separate part which is cast into the mounting plate. A plurality of bosses 322 extend from the mounting plate 312 in a direction away from the hub portion 316. A clearance hole 324 extends through each of the bosses 322 and through the mounting plate 312.

A rotatable fastener 330 identical to the fastener 180 described in the first embodiment is supported for rotation by the hub portion 316. A first end portion 332 of the fastener 330 comprises a spur gear with a cylindrical projection 334 extending axially away from the hub portion 316. A second end portion 336 of the fastener 330 includes a threaded outer surface 338 for engaging the threaded inner surface 18 of the vehicle steering shaft 14.

The steering wheel assembly 300 includes a retainer plate 340 overlying the first end portion 332 of the fastener 330. The retainer plate 340 is generally rectangular in shape and has a central portion 342 partially encircled by a peripheral portion 344. The central portion 342 is axially offset from the peripheral portion 344 and has an opening 346 for receiving the projection 334 on the first end portion 332 of the fastener 330. The peripheral portion 344 has a plurality of openings 348 which align with a plurality of threaded openings 350 in the mounting plate 312 and which receive fasteners 352 to secure the peripheral portion of the retainer plate 340 to the mounting plate.

The steering wheel assembly 300 further includes an inflatable vehicle occupant protection device in the form of an air bag module 360 which is secured to the mounting plate 312. The air bag module 360 includes a folded air bag 362, an air bag retainer 364, an air bag inflator 366, and a reaction plate 368. The reaction plate 368 is supported by the bosses 322. A plurality of studs 370 extend through the air bag retainer 364, the air bag 362, and the reaction plate 368. Each of the studs 370 further extends through a respective one of the clearance holes 324 in the bosses 322 and the mounting plate 312. Nuts 372 are screwed onto the studs 370 to secure the air bag module 360 in the steering wheel assembly 300.

The steering wheel assembly 300 is attached to and removed from the steering shaft 14 by rotating the fastener 330 as described above in the first embodiment regarding the fastener 180. The reaction plate 340 functions identically to the reaction plate 200 described above.

Figure 9:
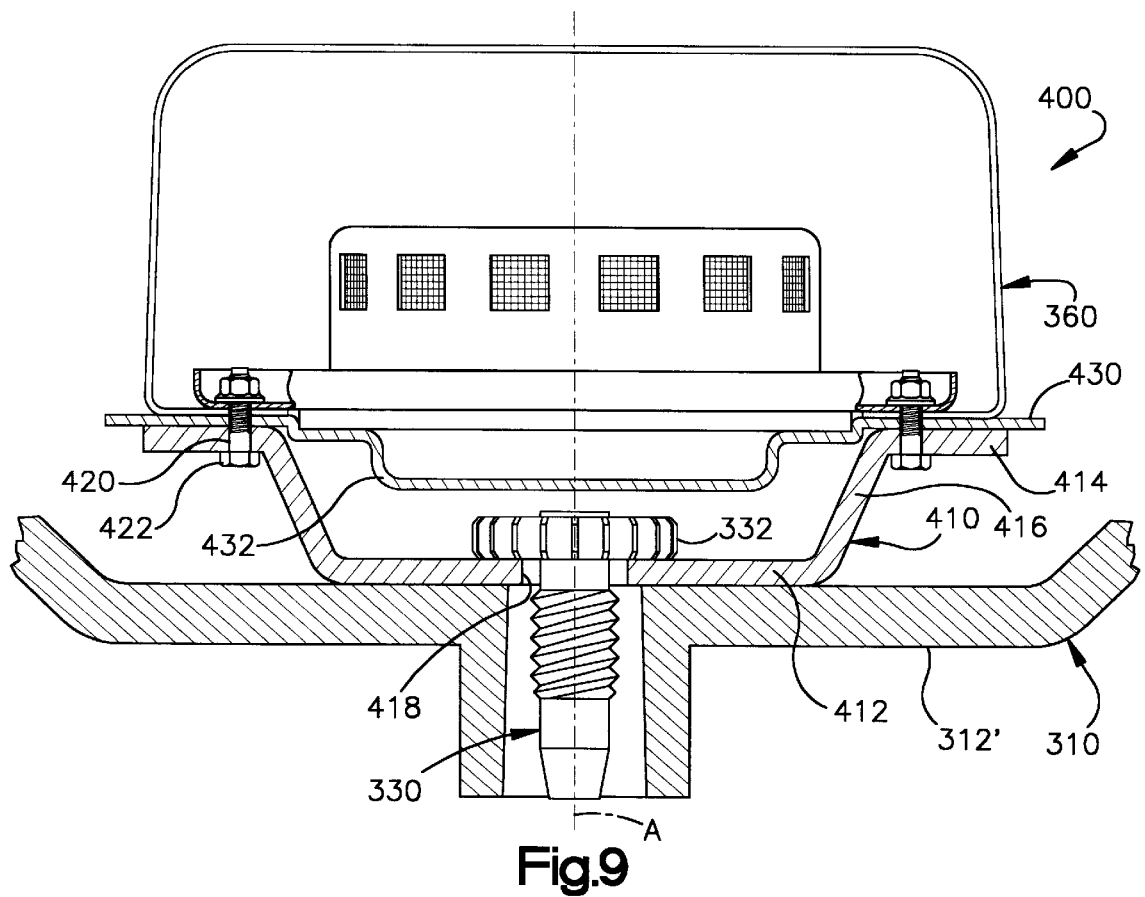
FIG. 9 is a schematic sectional view of a steering wheel assembly constructed in accordance with a fourth embodiment of the present invention.

FIG. 9 illustrates a steering wheel assembly 400 constructed in accordance with a fourth embodiment of the present invention. In the embodiment of FIG. 9, identical structure to that of the third embodiment of FIGS. 7 and 8 is identified with same reference numerals. S1 Similar structure to that of the third embodiment is also identified with the same reference numerals, but with a prime added.

The steering wheel assembly 400 includes an air bag module 360' and a mounting bracket 410. The air bag module 360' includes a reaction plate 430 with a recessed wall portion 432 which is located axially adjacent the first end portion 332 of the fastener 330.

The mounting bracket 410 has a base portion 412 and a flange portion 414 connected by a radially and axially extending connecting portion 416. The base portion 412 has a centrally located opening 418 for receiving a portion of the rotatable fastener 330. The fastener 330 is supported for rotation by the base portion 412 of the mounting bracket 410. The flange portion 414 of the mounting bracket 410 has a plurality of spaced apart openings 420 for receiving bolts 422 for securing the air bag module 360'.

The steering wheel assembly 400 is attached to and removed from the steering shaft 14 by rotating the fastener 330 substantially as described above in the first embodiment. In the fourth embodiment of FIG. 9, the recessed wall portion 432 of the reaction plate 430 functions as a retainer plate to axially retain the fastener 330, stabilize the fastener during rotation, and provide a reaction surface during rotation of the fastener in the untightening direction. Further, the steering wheel assembly 400 eliminates bolts which are typically used to attach the air bag module 360' to the mounting plate 312' of the steering wheel armature 310' because the fastener 330 secures the air bag module to the steering wheel armature in addition to securing the steering wheel assembly to the steering shaft 14.

From the above description of the invention, those skilled in the art will perceive improvements, changes and modifications. Such improvements, changes and modifications within the skill of the art are intended to be covered by the appended claims.

Having described the invention, we claim:

1. A steering wheel assembly to be mounted on a vehicle steering shaft which rotates about an axis to steer a vehicle and which has a threaded end portion, said steering wheel assembly comprising:

a steering wheel armature;

an inflatable vehicle occupant protection device supported on said steering wheel armature;

an inflator for providing inflation fluid for inflating said inflatable vehicle occupant protection device;

a hub fixedly attached to said steering wheel armature and for non-rotatable attachment to the vehicle steering shaft;

a rotatable fastener rotatably supported on said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate spaced from said inflator and fixedly attached with said steering wheel armature, said retainer plate overlying said first end portion of said fastener and retaining said fastener on said steering wheel armature;

said retainer plate having a peripheral portion partially encircling a central portion, said central portion being axially offset from said peripheral portion.

2. A steering wheel assembly to be mounted on a vehicle steering shaft which rotates about an axis to steer a vehicle and which has a threaded end portion, said steering wheel assembly comprising:

a steering wheel armature;

an inflatable vehicle occupant protection device supported on said steering wheel armature;

an inflator for providing inflation fluid for inflating said inflatable vehicle occupant protection device;

a hub fixedly attached to said steering wheel armature and for non-rotatable attachment to the vehicle steering shaft;

a rotatable fastener rotatably supported on said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate spaced from said inflator and fixedly attached with said steering wheel armature, said retainer plate overlying said first end portion of said fastener and retaining said fastener on said steering wheel armature;

said second end portion of said fastener extending axially from said first end portion, said first end portion of said fastener including a projection extending axially from said gear means in a direction opposite said second end portion;

said retainer plate including an opening for receiving said projection of said fastener;

said retainer plate including a reaction surface surrounding said opening which is engaged by said first end portion of said fastener when said fastener is rotated in a second direction opposite to said first direction, said reaction surface reacting against said first end portion of said fastener when said fastener is rotated in said second direction to create a axial force tending to remove said hub from the steering shaft.

3. A steering wheel assembly to be mounted on a vehicle steering shaft which rotates about an axis to steer a vehicle and which has a threaded end portion, said steering wheel assembly comprising:

a steering wheel armature;

an inflatable vehicle occupant protection device supported on said steering wheel armature;

an inflator for providing inflation fluid for inflating said inflatable vehicle occupant protection device;

a hub fixedly attached to said steering wheel armature and for non-rotatable attachment to the vehicle steering shaft;

a rotatable fastener rotatably supported on said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate spaced from said inflator and fixedly attached with said steering wheel armature, said retainer plate overlying said first end portion of said fastener and retaining said fastener on said steering wheel armature;

said retainer plate partially encircling said fastener and leaving a peripheral portion of said gear means uncovered.

4. A steering wheel assembly to be mounted on a vehicle steering shaft which rotates about an axis to steer a vehicle and which has a threaded end portion, said steering wheel assembly comprising:

a steering wheel armature;

an inflatable vehicle occupant protection device supported on said steering wheel armature;

an inflator for providing inflation fluid for inflating said inflatable vehicle occupant protection device;

a hub fixedly attached to said steering wheel armature and for non-rotatable attachment to the vehicle steering shaft;

a rotatable fastener rotatably supported on said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate spaced from said inflator and fixedly attached with said steering wheel armature, said retainer plate overlying said first end portion of said fastener and retaining said fastener on said steering wheel armature;

said steering wheel armature including a mounting member, said hub and said retainer plate being fixedly secured to said mounting member.

5. A steering wheel assembly to be mounted on a vehicle steering shaft which rotates about an axis to steer a vehicle and which has a threaded end portion, said steering wheel assembly comprising:

a steering wheel armature having a rim portion, a ring portion, and a plurality of spokes interconnecting said rim portion and said ring portion;

a mounting member attached to said ring portion, said member having a hub fixedly attached to said steering wheel armature;

a rotatable fastener rotatably supported by said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate fixedly attached to said mounting member and overlying said first end portion of said fastener, said retainer plate retaining said fastener on said mounting member;

said retainer plate having planar peripheral portion partially encircling a planar central portion, said central portion being axially offset from said peripheral portion.

6. The steering wheel assembly of claim 5 wherein said peripheral portion of said retainer plate extends less than 360° around said central portion of said retainer plate so that a peripheral portion of said gear means is exposed.

7. A steering wheel assembly to be mounted on a vehicle steering shaft which rotates about an axis to steer a vehicle and which has a threaded end portion, said steering wheel assembly comprising:

a steering wheel armature having a rim portion, a ring portion, and a plurality of spokes interconnecting said rim portion and said ring portion;

a member attached to said ring portion, said member having a hub fixedly attached to said steering wheel armature;

a rotatable fastener rotatably supported by said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate fixedly attached to said member and overlying said first end portion of said fastener, said retainer plate retaining said fastener on said member;

said retainer plate having a planar peripheral portion partially encircling a planar central portion, said central portion being axially offset from said peripheral portion;

said first end portion of said fastener having radially extending first and second surfaces, said first and second surfaces defining an axial thickness for said first end portion;

said hub and said central portion of said retainer being separated by an axial space having an axial height, said height of said axial space being greater than said axial thickness of said first end portion of said fastener;

said first end portion of said fastener including a cylindrical projection extending axially from said first surface, said second end portion of said fastener extending axially from said second surface of said first end portion;

said central portion of said retainer plate including an opening for receiving said cylindrical projection of said first end portion of said fastener;

said central portion of said retainer plate including a reaction surface surrounding said opening which is engaged by said first surface of said fastener when said fastener is rotated in a second direction opposite to said first direction, said reaction surface reacting against said first surface of said fastener when said fastener is rotated in said second direction to create a axial force tending to remove said hub from the steering shaft.

8. A steering wheel assembly to be mounted on a vehicle steering shaft which rotates about an axis to steer a vehicle and which has a threaded end portion, said steering wheel assembly comprising:

a steering wheel armature including a mounting member;

an inflatable vehicle occupant protection device supported on said steering wheel armature;

an inflator for providing inflation fluid for inflating said inflatable vehicle occupant protection device;

a hub fixedly attached to said steering wheel armature and for non-rotatable attachment to the vehicle steering shaft;

a rotatable fastener rotatably supported on said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate fixedly attached with said steering wheel armature and located axially between said inflator and said mounting member, said retainer plate overlying said first end portion of said fastener and defining an axial space between said hub and said retainer plate, said fastener being disposed in said space and being retained on said steering wheel armature by said retainer plate.

9. The steering wheel assembly of claim 8 wherein said first end portion of said fastener comprises a spur gear.

10. The steering wheel assembly of claim 8 wherein said second end portion of said fastener extends axially from said first end portion, said first end portion of said fastener including a projection extending axially from said gear means in a direction opposite said second end portion.

11. The steering wheel assembly of claim 10 wherein said retainer plate includes an opening, said projection on said fastener being disposed in said opening.

12. The steering wheel assembly of claim 8 wherein said retainer plate includes a reaction surface which is engaged by said first end portion of said fastener when said fastener is rotated in a second direction opposite to said first direction, said reaction surface reacting against said first end portion of said fastener when said fastener is rotated in said second direction to create a axial force tending to remove said hub from the steering shaft.

13. The steering wheel assembly of claim 8 wherein said hub includes a bore having a tapered surface, said second end portion of said fastener being disposed in said bore.

14. A steering wheel assembly to be mounted on a vehicle steering shaft which rotates about an axis to steer a vehicle and which has a threaded end portion, said steering wheel assembly comprising:

a steering wheel armature having a rim portion, a ring portion, and a plurality of spokes interconnecting said rim portion and said ring portion;

a mounting member attached to said ring portion, said member having a hub fixedly attached to said steering wheel armature;

a rotatable fastener rotatably supported by said hub and for axially forcing said hub onto the steering shaft upon rotation of said fastener in a first direction, said fastener having a first end portion including gear means for rotating said fastener and a second end portion for threadedly engaging the threaded end portion of the steering shaft upon rotation of said fastener; and a retainer plate fixedly attached to said mounting member, said retainer plate overlying said first end portion of said fastener and defining an axial space between said hub and said retainer plate, said fastener being disposed in said space and being retained on said mounting member by said retainer plate.

15. The steering wheel assembly of claim 14 wherein said retainer plate has a planar peripheral portion partially encircling a planar central portion, said central portion being axially offset from said peripheral portion.

16. The steering wheel assembly of claim 15 wherein said first end portion of said fastener has radially extending first and second surfaces, said first and second surfaces defining an axial thickness for said first end portion.

17. The steering wheel assembly of claim 16 wherein said axial space has an axial height that is greater than said axial thickness of said first end portion of said fastener.

18. The steering wheel assembly of claim 17 wherein said first end portion of said fastener includes a cylindrical projection extending axially from said first surface, said second end portion of said fastener extending axially from said second surface of said first end portion.

19. The steering wheel assembly of claim 18 wherein said central portion of said retainer plate includes an opening for receiving said cylindrical projection of said first end portion of said fastener.

\* \* \* \* \*